No. 688,659.  
G. W. MANSON.  
BICYCLE SEAT.  
(Application filed Nov. 17, 1900.)  
Patented Dec. 10, 1901.

(No Model.)

WITNESSES:

INVENTOR  
Geo. W. Manson  
BY  
Knight Bros  
ATTORNEYS

UNITED STATES PATENT OFFICE.

GEORGE W. MANSON, OF NEW YORK, N. Y.

BICYCLE-SEAT.

SPECIFICATION forming part of Letters Patent No. 688,659, dated December 10, 1901.

Application filed November 17, 1900. Serial No. 36,845. (No model.)

*To all whom it may concern:*

Be it known that I, GEORGE W. MANSON, a citizen of the United States, and a resident of the borough of Manhattan, in the city and State of New York, have invented a new and useful Improvement in Bicycle-Seats, of which the following is a specification.

My invention is especially applicable to a bicycle of the general construction described in Letters Patent No. 616,421, granted to me the 20th of December, 1898, and in other applications of even date with this.

My present improvement relates to the manner of mounting a seat for bicycles and the like and providing vertical and longitudinal adjustment therefor.

Figure 1:
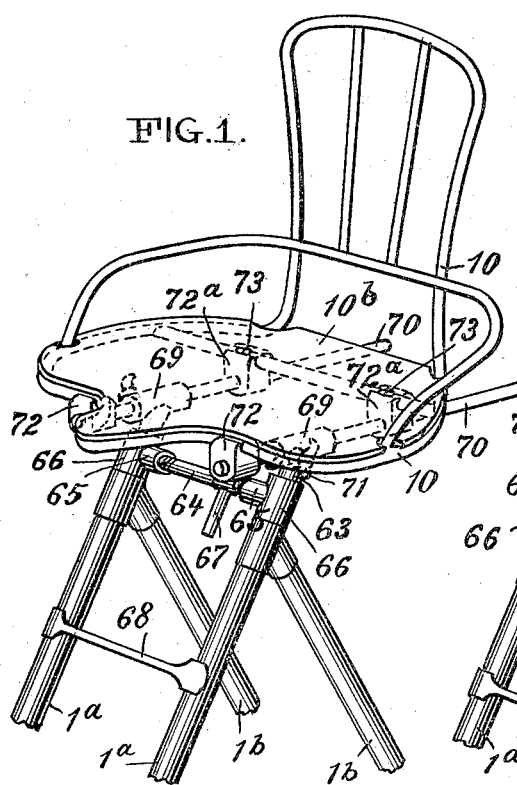
Figure 2:
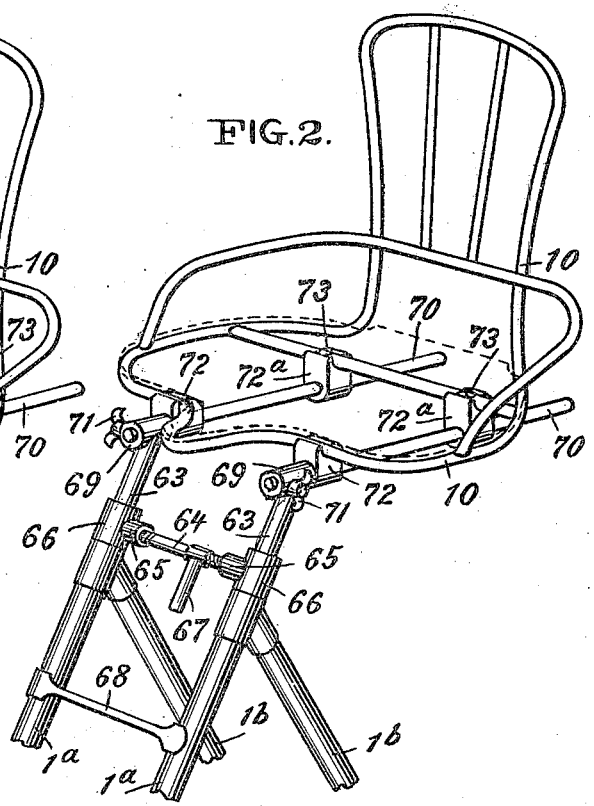
Figure 3:
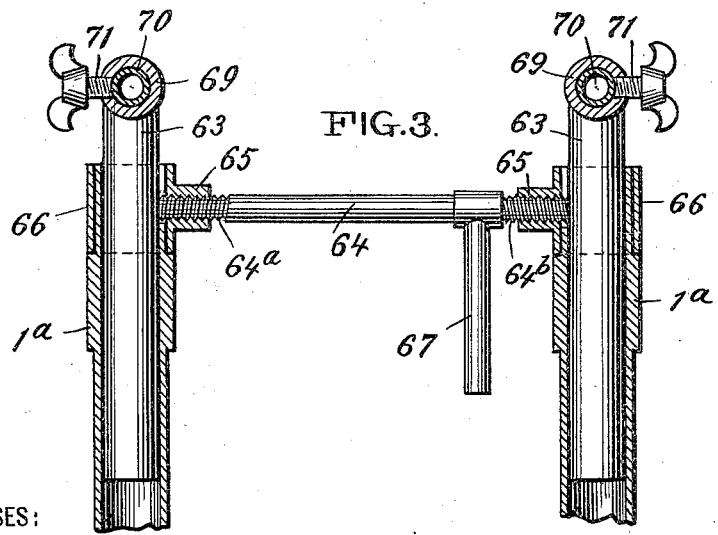

In the accompanying drawings, Figure 1 is a perspective view of my improved seat for bicycles or other cycles, showing the seat in its low and forward adjustment. Fig. 2 is a perspective view of the same, showing the seat elevated and in rearward adjustment. Fig. 3 is a vertical section, on a larger scale, of a portion of the supporting-frame.

$1^a$ represents tubular seat-posts, and $1^b$ tubular brace-bars, forming part of the bicycle-frame. Sliding telescopically in the tubular posts $1^a$ are tubular extension-posts 63, which are held at any desired height of adjustment by a double clamp-screw 64, having on its ends right and left threads $64^a$ $64^b$, working in corresponding fixed nuts 65, formed on sleeves 66, fitted to the upper ends of the seat-posts $1^a$. A hand-lever 67, projecting rigidly from the body of the clamp screw-bar 64, enables the turning of it with adequate force to firmly fix the extension-posts 63 at any height to which they may be adjusted or easily retracted to release them, so that they may be set up or down. A horizontal strut or tie-bar 68 connects the seat-posts $1^a$ and holds them at a fixed distance asunder.

Rigidly and firmly secured on the upper ends of the extension-posts 63 are horizontal sleeves 69, adapted to receive tubular rods 70, firmly support them in horizontal position, and permit their longitudinal adjustment. The horizontal rods 70 are fixed in any position of longitudinal adjustment by thumb-screws 71, which clamp them in the fixed sleeves 69.

The skeleton frame of the seat 10 is supported by two pairs of blocks 72 $72^a$, perforated to fit the horizontal rods 70, on which they may be slid, and fixed in any position of adjustment by set-screws 73. The seat-bottom $10^b$ is shown in position in Fig. 1 and indicated in dotted outline in Fig. 2.

The mode of vertical adjustment to adapt the seat to the length of pedal reach of the rider will be understood by the description already given and a comparison of the positions in Figs. 1 and 2. The extension-posts 63 being slid up or down, as required, are fixed in position by turning the screw clamp-bar 64 by means of the hand-lever 67. For longitudinal adjustment within usual limits or within the distance asunder of the front and rear supporting-blocks 72 $72^a$ it is only necessary to retract the thumb-screws 71, slide the seat forward or back, and again fix it in position by clamping said supporting-rods with the thumb-screws. My invention thus provides the greatest facility for all usual adjustments of the seat with the greatest ease and celerity without the use of tools. If extreme backward adjustment of the seat is desired beyond the limits afforded with the parts in the relations shown in Fig. 1, as for persons of unusual length of limb, this can be afforded by slipping the horizontal rods out of the fixed clamp-sleeve 69 and fixing the front extremities of said rods in the clamp-sleeves, moving the blocks 72 to the rear of said sleeves, as illustrated in Fig. 2. The seat may then be set back until the rear supporting-blocks $72^a$ reach the rear ends of the rods 70.

Having thus described my invention, the following is what I claim as new therein and desire to secure by Letters Patent:

1. The combination with two parallel supporting-standards, having fixed nuts and extension-standards slidable therein, of a clamp screw-bar connecting the supporting-standards having right and left screw-threads on its ends respectively adapted to engage said nuts and to clamp the extension-standards in any desired position in the supporting-standards, and an operating-handle secured to the clamping-screw.

2. The combination with two parallel hollow supporting-standards, screw-threaded openings in one side of the same, and vertically-adjustable standards slidable in the standards, a clamp screw-bar having right and left screw-threads adapted to engage the threaded openings in the standards, clamp-sockets secured to the top of said adjustable standards, of two horizontal parallel supports adjustably mounted in the sockets of the vertically-adjustable standards and a seat adjustably secured on said horizontal supports.

3. The combination of the supporting-standards 1ª, extension-standards 63, clamp screw-bar 64, nuts 65, slidable horizontal bars 70, sleeves 69 and seat 10, supported on the bars 70, substantially as and for the purposes set forth.

GEORGE W. MANSON.

Witnesses:
 OCTAVIUS KNIGHT,
 K. E. MANNING.